Sept. 4, 1928.      1,683,295
A. E. MAYNARD
LENS CUTTER
Original Filed July 22, 1922

INVENTOR
A. E. Maynard.
BY
Harry H. Styll
ATTORNEY

Patented Sept. 4, 1928.　　　　　　　　　　　　　　　　　　　　　　　　　　　　1,683,295

UNITED STATES PATENT OFFICE.

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS CUTTER.

Original application filed July 22, 1922, Serial No. 576,846. Divided and this application filed April 28, 1924, Serial No. 709,508, and in Great Britain July 6, 1922.

This invention relates to improvements in cutters, and has particular reference to a novel and improved construction of machine particularly adapted for use in the cutting of ophthalmic lenses. The present application is a division of my co-pending application Serial Number 576,846, filed July 22, 1922, now Patent Number 1,621,331, March 15, 1927.

An important object of the invention is to provide an improved lens cutting machine which will be readily adapted to cut lenses of any desired commercial shape.

Another object is to provide such a machine with an improved cutting tool guiding member whereby the shape of the former will be accurately transferred to the cut lens, particularly where there is a sudden change in the contour of the lens.

Another object is to provide such a device which will be strong and durable in service, easy and accurate in operation, and a general improvement in the art.

With these and other objects in view the invention resides in the novel features of construction, combination and arrangement of parts hereinafter pointed out, illustrated in the accompanying drawings and specifically set forth in the appended claims.

In the drawings forming a part of this application:

Figure 1:
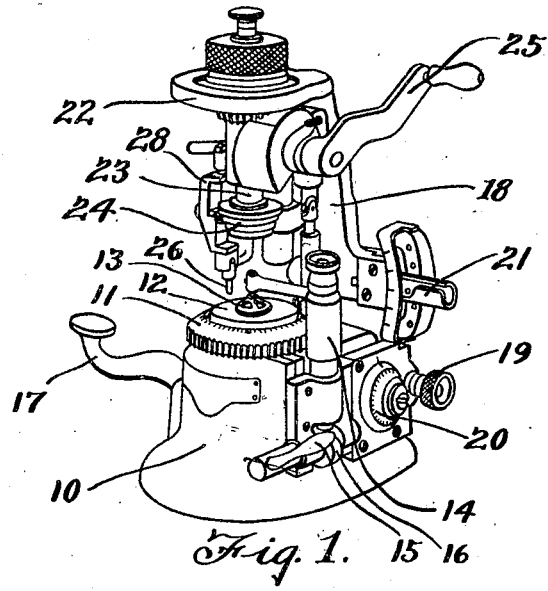
Figure 1 is a perspective view of a complete lens cutting machine embodying the invention.
Figure 2:
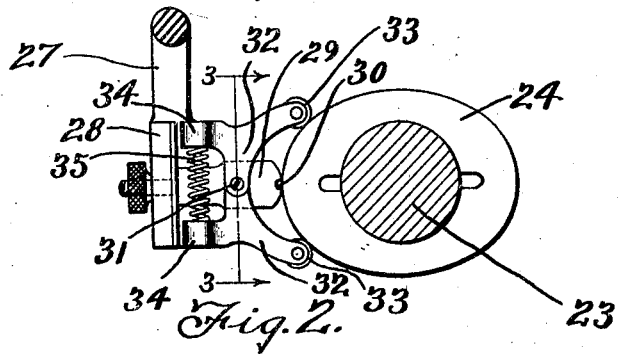
Figure 2 is an enlarged transverse sectional view illustrating my improved tool guiding mechanism.
Figures 3, 4:
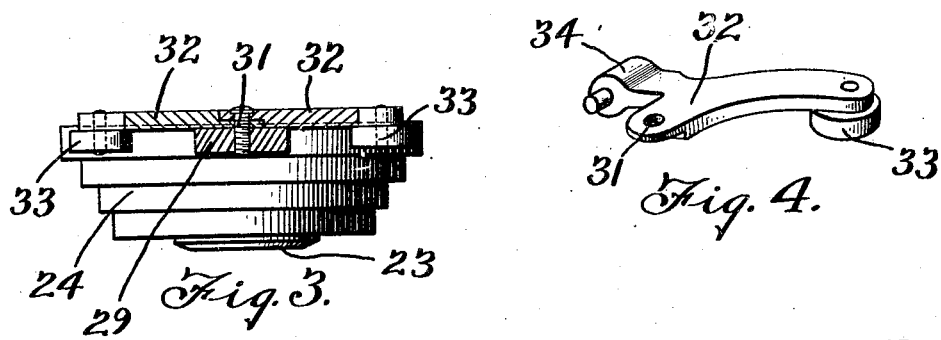
Figure 3 is a sectional view on the line 3—3 of Figure 2.
Figure 4 is a detail perspective view of one of the former tracking members.

My improved lens cutting machine comprises a base member 10 having rotatably mounted thereon a lens supporting table 11, upon which may be securely mounted a lens 12 clampingly held by the hold-down member 13. The member 13 is supported by a post 14 and may be swung out of operative position by means of the handle 15 actuating the cam 16. The lens table 11, together with the clamping mechanism may be moved vertically to present the lens against a cutting tool by means of the lever 17.

Rising from the base 10 at the rear thereof is a head support 18 which is adjustable longitudinally of the machine by means of a thumb screw 19, the amount of adjustment being indicated on the dial 20. Also the member 18 is pivoted in such a way that by means of the finger engaging portion 21 and suitable latch mechanism carried thereby the whole head of the machine may be tilted to properly position the cutting tool in relation to the surface of the work, as will be clearly apparent to those skilled in the art. The supporting member 18 is provided at its upper end with a head 22 in which is mounted a suitable spindle 23 carrying preferably a plurality of lens shapes which may be selectively positioned according to the nature of the work to be done. The spindle and the lens shapes, as well as the lens supporting table 11 may be synchronously rotated by operation of the handle 25. All of the foregoing structure and function has been clearly set out in the above mentioned co-pending application.

The present invention relates particularly to the former engaging mechanism whereby the cutting point 26, which is preferably a diamond, is accurately moved in such a way as to transfer the desired shape to the lens being operated upon. This improved tracking mechanism comprises a yielding arm 27, which is pivoted in any desirable manner to the member 18 and actuated by a spring to force the free end of the arm towards the spindle 23. Pivotally carried in the free end of the arm 27 is a yoke 28 which carries the diamond at its lower end. Midway of its ends and at the side towards the formers 24 the yoke 28 is provided with a contact shoe 29 which is centrally notched as at 30 for a purpose to be hereinafter described. The face of the shoe 29 is preferably convex so as to give a very small bearing surface against the former 24.

Pivoted as at 31 to the contact shoe 29 is a pair of arms 32 carrying at their inner extremities rollers 33 which are adapted to act as supplemental contact members against the former. Disposed between the outer extremities 34 of the arms 32 is a spring member 35 which is under compression so that the natural tendency is to force the rollers 33 towards each other.

From this description it will be clear that as the yielding member 27 is actuated by its spring towards the former 24, the contact shoe 29 will engage the periphery of the former, as will the supplemental shoes or rollers 33, and as the spindle 23 is rotated to turn the former, the members will readily follow the contour of the pattern so as to accurately guide the diamond point 26 operating against the lens.

In use this form of tracking mechanism is adaptable to cut any shape of lens, including round, oval, hexagonal, or special shapes, and in this connection it may be well to mention that the notch 30 in the end of the contact shoe 29 is especially useful when cutting hexagonal lenses or other lenses with a sharp change in direction in their contour. When such a pattern is rotated the sharp corner engages in the notch and swings the diamond suddenly to transfer the proper sharp corner to the work. Due to the fact that the supplemental contact members are pivoted at 31 and yieldable, the rollers 33 will always engage the periphery of the former 24, regardless of the shape of the former. This is especially advantageous in connection with the cutting of hexagonal or other odd shaped lenses, in that the diamond or other cutting tool is always maintained in a line tangent to that of the cut.

It is thought that the operation of the machine is sufficiently well brought out in my co-pending application mentioned above, and that the operation of the improved tracking mechanism which is the subject matter of this application will be obvious from the foregoing description. Of course, changes may be resorted to in the form and proportion of parts, and I herein reserve the right to make such changes falling within the scope of the appended claims without departing from the spirit of my invention.

Having thus described my invention, what I claim is:

1. In a lens cutter, the combination with a cutter head bearing a former contact, said contact including spaced arms each having a portion pivoted to a corresponding portion on the other, and a coil spring between the outer ends of said arms to retain the inner ends thereof in normal contact with a former.

2. In a lens cutter, a former, a cutter head having a swinging arm, former engaging members arranged on said arm, a cutter carried by the swinging arm adjacent its outer end, spaced arms on the swinging arm each pivoted thereto and engaging the former, and a spring disposed between the outer ends of said pivoted arms to retain the engaging parts in normal engagement with the former.

3. In a lens cutter, a former, a supporting arm, a head at the outer end of said arm, a cutter carried by the head, spaced arms supported upon the head, said arms being pivotally connected to the head, contact rollers at the outer ends of said arms, and a coil spring arranged between said arms, to retain the rollers in engagement with the former.

4. In a lens cutter, a former, means to rotate the former, a former contact member comprising a swinging arm, spaced engaging portion supports pivoted on the arm, resilient means to force the supports towards each other and a contact wheel on each support engaging the former, said pivot allowing the contact wheels on the pivoted engaging portions to adjust themselves to the contour of the former as the former is rotated.

5. The combination with a lens cutting machine, of a cutter former and a cutter member comprising a head, a relatively rigid contact shoe carried thereby, movable supplementary contact shoes associated with said head, resilient means engaging the supplementary contact shoes, and a cutting point on the cutter member.

6. In a device of the character described, a former, a swinging arm, a contact plate on the swinging arm having a convex contact edge, there being a notch in the contact edge where it engages the former.

7. In a lens cutter, a tracking mechanism including a contact member adapted to engage a former, said contact member being slightly notched on the former engaging surface, and supplemental former contacts pivotally mounted on the first mentioned contact member.

8. In a lens cutter, a tracking mechanism including a contact member adapted to engage a former, said contact member being slightly notched on the former engaging surface, supplemental former contacts pivotally mounted on the first mentioned contact member, and yieldable means engaging the supplemental former contacts to press them yieldingly against the former.

9. In a device of the character described, a former, a swinging arm, a pair of contact arms pivoted on the swinging arm, former contacts on each pivoted arm, and yielding means to hold the former contacts against the former.

ALBERT E. MAYNARD.